(12) United States Patent
Bachmaier et al.

(10) Patent No.: US 10,330,125 B2
(45) Date of Patent: Jun. 25, 2019

(54) HYDRAULIC ACTUATOR AND METHOD FOR OPERATING A HYDRAULIC ACTUATOR

(71) Applicant: SIEMENS AKTIENGESELLSCHAFT, München (DE)

(72) Inventors: Georg Bachmaier, München (DE); Andreas Gödecke, München (DE); Thomas Vontz, München (DE); Wolfgang Zöls, München-Lochhausen (DE)

(73) Assignee: MetisMotion GmbH, München (DE)

( * ) Notice: Subject to any disclaimer, the term of this patent is extended or adjusted under 35 U.S.C. 154(b) by 20 days.

(21) Appl. No.: 15/329,298

(22) PCT Filed: Mar. 25, 2015

(86) PCT No.: PCT/EP2015/056371
§ 371 (c)(1),
(2) Date: Jan. 26, 2017

(87) PCT Pub. No.: WO2016/015879
PCT Pub. Date: Feb. 4, 2016

(65) Prior Publication Data
US 2017/0227023 A1 Aug. 10, 2017

(30) Foreign Application Priority Data
Jul. 30, 2014 (DE) .................. 10 2014 214 977

(51) Int. Cl.
*F15B 7/08* (2006.01)
*F15B 13/02* (2006.01)
(Continued)

(52) U.S. Cl.
CPC .................. *F15B 7/08* (2013.01); *F15B 1/26* (2013.01); *F15B 13/024* (2013.01); *F15B 15/149* (2013.01); *H02N 2/043* (2013.01)

(58) Field of Classification Search
CPC . H02N 2/043; F15B 7/08; F15B 7/003; F15B 1/26; F15B 15/149
See application file for complete search history.

(56) References Cited

U.S. PATENT DOCUMENTS

2011/0180160 A1 7/2011 Froehlich et al.
2015/0113976 A1 4/2015 Bachmaier et al.

FOREIGN PATENT DOCUMENTS

CN 102177348 A 9/2011
DE 102008046562 A1 3/2010
(Continued)

OTHER PUBLICATIONS

Chinese Office Action for related Chinese Application No. 201580040769.9 dated Sep. 30, 2017.
(Continued)

*Primary Examiner* — Abiy Teka
(74) *Attorney, Agent, or Firm* — Lempia Summerfield Katz LLC

(57) ABSTRACT

The hydraulic actuator comprises: a hydraulic input cylinder having an input piston; a hydraulic output cylinder, which is hydraulically coupled to the input cylinder; and a pressure-limiting valve, which limits the output cylinder with respect to pressure in dependence on the usability of a force on the input piston. The method is a method for operating such a hydraulic actuator, wherein the drive actuator is deflected with deflections having a deflection duration at a deflection frequency for the duration of an acting or a non-acting phase of the hydraulic actuator, wherein the deflection duration defines a movement stiffness of the hydraulic actuator and
(Continued)

the deflection frequency defines the resulting deflection speed of the hydraulic actuator.

11 Claims, 2 Drawing Sheets

(51) Int. Cl.
*H02N 2/04* (2006.01)
*F15B 1/26* (2006.01)
*F15B 15/14* (2006.01)

(56) References Cited

FOREIGN PATENT DOCUMENTS

| DE | 102011085127 A1 | 4/2013 | |
|---|---|---|---|
| DE | 102012206834 A1 | 10/2013 | |
| DE | 102012211313 A1 | 1/2014 | |
| DE | 102012222173 A1 | 6/2014 | |
| JP | S5029222 B1 | 9/1975 | |
| WO | WO 2014001083 A1 * | 1/2014 | ............... F15B 7/08 |
| WO | WO2014001083 A1 | 1/2014 | |
| WO | WO2013160398 A | 4/2015 | |

OTHER PUBLICATIONS

Japanese Office Action for Japanese Application No. 2017-505132, dated Feb. 5, 2018.
German Search Report for related German Application No. 10 2014 214 977.0 dated Jun. 26, 2015, with English Translation.
Godecke A. et al.: "Ratchet-type micro-hydraulic actuator to mimic muscle behavior"; IECON 2013—39th Annual Conference of the IEEE Industrial Electronics Society; IEEE; pp. 3976-3981; XP032539148; ISSN: 1553-572X; DOI:10.1109/IECON.2013. 6699771, 2013.
PCT International Search Report and Written Opinion of the International Searching Authority dated Sep. 16, 2015 for corresponding PCT/EP2015/056371, with English Translation.
Chinese Office Action for Chinese Application No. 201580040769.9 dated Jun. 12, 2018.
Chinese Office Action for Chinese Application No. 201580040769.9 dated Oct. 26, 2018.
Japanese Grant Decision for Japanese Application No. 2017-505132, dated Nov. 5, 2018.
Korean Notice of Reasons for Rejection for related Korean Application No. 10-2017-7005831 dated Jul. 13, 2018.

\* cited by examiner

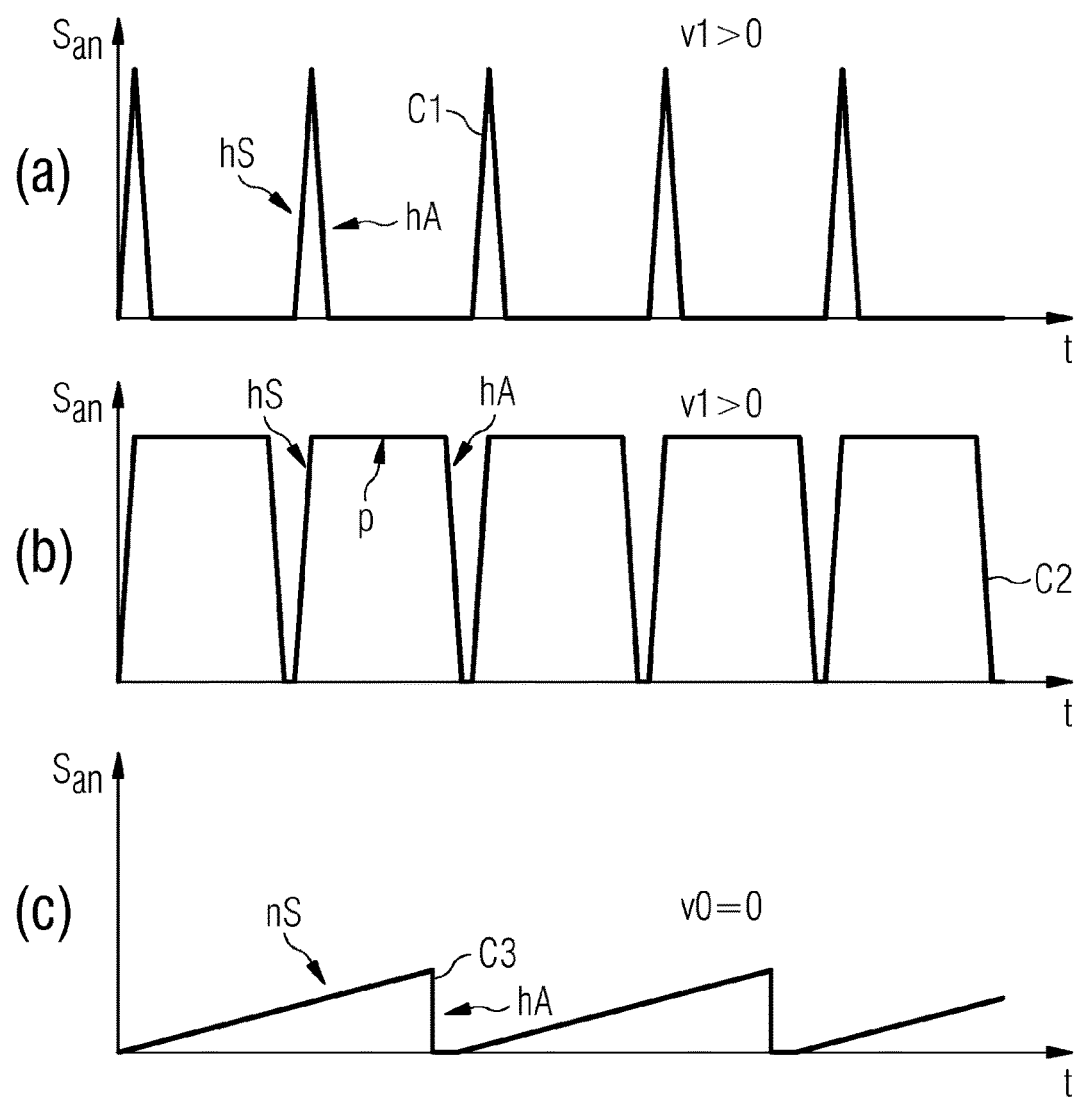

HYDRAULIC ACTUATOR AND METHOD FOR OPERATING A HYDRAULIC ACTUATOR

CROSS-REFERENCE TO RELATED APPLICATIONS

This application is the National Stage of International Application No. PCT/EP2015/056371, filed Mar. 25, 2015, which claims the benefit of German Patent Application No. DE 102014214977.0, filed Jul. 30, 2014. The entire contents of these documents are hereby incorporated herein by reference.

BACKGROUND

The present embodiments relate to a hydraulic actuator and to a method for operating a hydraulic actuator.

Greater flexibility of conventional machine automation is desired (e.g., within the scope of "industry 4.0"). "Soft roboting" has gained importance in recent times. Manufacturing robots are intended to cooperate directly with humans during soft roboting. Actuators having a variable stiffness and a low mass are to be provided for this purpose. Models for actuators of this kind are muscles of the human body that, depending on the application, may prestress, increasing the stiffness. However, muscles of the human body are not prestressed in a normal state; therefore, in the event of a collision with a stiff object, the force on the body and the risk of injury is minimized. However, actuators that have been used to date have had a high stiffness. Sensors that identify obstacles and stop the actuator in serious cases or divert the actuator away from an obstacle are used in order to avoid collisions.

SUMMARY AND DESCRIPTION

The scope of the present invention is defined solely by the appended claims and is not affected to any degree by the statements within this summary.

The present embodiments may obviate one or more of the drawbacks or limitations in the related art. For example, an improved actuator (e.g., with variable stiffness) is provided. A method for operating an improved actuator of this kind is also provided.

The hydraulic actuator according to one or more of the present embodiments includes a hydraulic drive cylinder (e.g., with a drive piston), a hydraulic output cylinder hydraulically coupled to the drive cylinder, and a pressure-limiting valve configured to limit the pressure on the output cylinder depending on an action time of a force on the drive cylinder and/or the drive piston.

The pressure-limiting valve may be controlled by the hydraulic actuator based on the action time of the force on the drive piston. The pressure-limiting valve limiting the pressure on the output cylinder sets the stiffness of the hydraulic actuator based on this pressure-limiting operation. Therefore, the stiffness of the hydraulic actuator may be set based on the action time of a force on the drive piston.

The hydraulic actuator according to one or more of the present embodiments includes a drive actuator coupled, in terms of movement, to the drive cylinder or to the drive piston. The hydraulic actuator may be electrically controllable. The hydraulic actuator may be a piezo actuator, an electrodynamic actuator, or an electromagnetic actuator. An actuator of this kind may be easily electrically controlled.

In the case of the hydraulic actuator according to one or more of the present embodiments, the drive cylinder may be hydraulically coupled by a non-return valve and a first throttle to a prestressing volume located in a prestressing hydraulic cylinder (e.g., with a prestressing piston). The prestressing hydraulic cylinder or the prestressing piston actuates the pressure-limiting valve. In this way, the prestressing volume, which suitably actuates the pressure-limiting valve by the prestressing piston, may be hydraulically set in a simple manner by the non-return valve and the throttle based on the action time of a force on the drive piston.

The prestressing volume is hydraulically connected to a reservoir by a second throttle in the hydraulic actuator. In this way, the prestressing volume may be fed from the reservoir or emptied into the reservoir given a corresponding action time.

In an embodiment, the pressure-limiting valve is provided for limiting pressure in relation to the reservoir or for releasing pressure into the reservoir in the hydraulic actuator. In this way, when there is a low stiffness of the hydraulic actuator, the output cylinder may release pressure into the reservoir, or depending on the position of the pressure-limiting valve, maintain a high stiffness.

An output piston may be guided in the output cylinder in the hydraulic actuator according to one or more of the present embodiments. In this way, the output piston functions as an operating element of the hydraulic actuator according to one or more of the present embodiments. As an alternative, the output cylinder may be formed with a folding bellows such that at least a portion of the output cylinder forms the operating element of the hydraulic actuator according to one or more of the present embodiments.

In an embodiment, the output cylinder is coupled to the drive cylinder by a prestressed non-return valve. In this way, driving of the drive cylinder or of the drive piston may be passed on when there is a sufficient pressure difference between the drive cylinder and the output cylinder. However, depending on the pressure conditions, the drive may also be reset without having a direct consequential effect on the output cylinder (e.g., so that, as a result of periodic movement of the drive cylinder or of the drive piston, a large linear stroke is achieved by the output cylinder).

A method according to one or more of the present embodiments for operating a hydraulic actuator including a hydraulic drive cylinder (e.g. with a drive piston and a drive actuator coupled in terms of movement to this drive cylinder or drive piston) is provided. In the method, the drive actuator is deflected with deflections having a deflection period at a deflection frequency for the duration of an operating or a non-operating phase of the hydraulic actuator. The deflection period defines a movement stiffness of the hydraulic actuator, and the deflection frequency defines the resulting deflection rate of the hydraulic actuator.

In an embodiment, a drive actuator is electrically controllable (e.g., a piezo actuator, an electrodynamic actuator, or an electromagnetic actuator) in the disclosed method.

In an embodiment, the hydraulic drive cylinder, the hydraulic output cylinder, and/or the prestressing hydraulic cylinder are/is each formed with a folding bellows.

BRIEF DESCRIPTION OF THE DRAWINGS

FIG. 2 schematically shows a graphical illustration of operating modes (a), (b) and (c) of the hydraulic actuator according to the embodiment depicted in FIG. 1.

DETAILED DESCRIPTION

Figure 1:
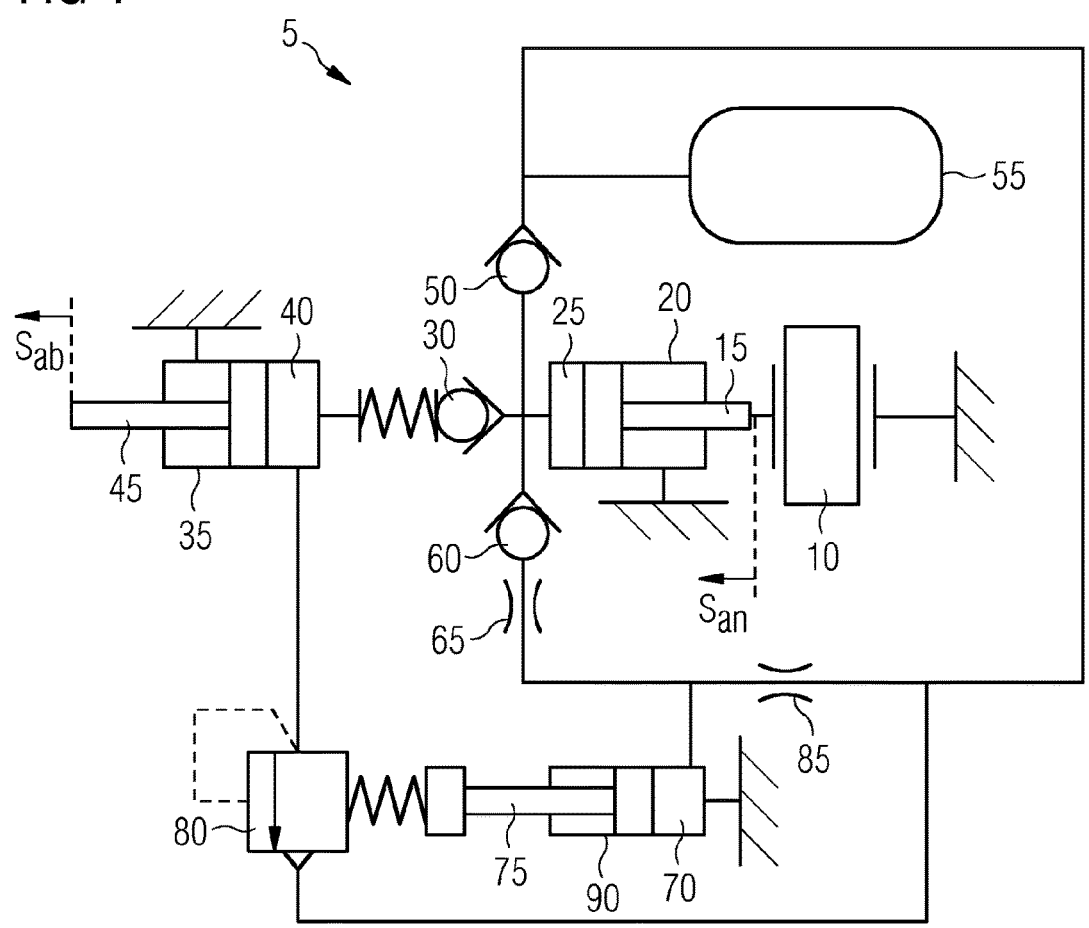
FIG. 1 schematically shows a hydraulic circuit diagram of a hydraulic actuator according to an embodiment.

The hydraulic actuator 5 according to the embodiment illustrated in FIG. 1 includes a piezo actuator 10 coupled in terms of movement to a drive piston 15 of a hydraulic drive cylinder 20.

The drive cylinder 20 includes a hydraulic drive volume 25 filled with hydraulic oil in a known manner. The drive volume 25 is hydraulically coupled to a hydraulic output cylinder 35 and is configured to open when there is a sufficiently high opening pressure. The non-return valve 30 is correspondingly prestressed. The output cylinder 35 includes an output volume 40 at the drive end that moves an output piston 45 located on the output side.

The drive volume is also coupled to a reservoir 55, such that the drive volume may feed the reservoir 55 via a non-return valve 50.

The drive volume 25 may also feed a prestressing volume 70 of a hydraulic prestressing cylinder 90, which controls a pressure-limiting valve 80 via a prestressing piston 75, a non-return valve 60 and a throttle 65 arranged downstream of the non-return valve 60 in the passage direction. The prestressing volume 70 is coupled to the reservoir 55 via a second throttle 85. The pressure-limiting valve 80 limits the pressure or releases the pressure on the output volume into or in relation to the reservoir 55.

The hydraulic actuator 5 according to the embodiment illustrated in FIG. 1 is operated in the manner described below. The individual operating modes are characterized by driving of the piezo actuator 10, as shown in the actuating travel/time graphs (a), (b) and (c) depicted in FIG. 2. FIG. 2 is described in greater detail below.

In a first operating mode, the hydraulic actuator is operated with a low system stiffness and actuated at an actuating rate v1 (e.g., different from zero).

The piezo actuator 10 is actuated as graphically shown by curve C1 in FIG. 2. In (a), the piezo actuator 10 is quickly deflected (e.g., the actuating path $s_{an}$ rises with a steep gradient hS over time t). The pressure in the drive volume 25 of the drive cylinder 20 increases such that the non-return valve 30 coupling the drive volume 25 to the output volume 40 opens, and the non-return valve 60 coupling the drive volume 25 to the prestressing volume 70 opens. Because the deflection of the piezo actuator 10, and therefore the increase in pressure in the drive volume 25, are short in this first operating mode, virtually no hydraulic oil flows in the direction of the prestressing volume 70 through the non-return valve 60 coupling the drive volume 25 to the prestressing volume 70. This small flow of hydraulic oil again flows away into the reservoir 55 via the throttle 85 coupling the prestressing volume 70 to the reservoir. Therefore, virtually no pressure builds up in the prestressing volume 70. Therefore, the hydraulic oil flows almost exclusively into the output volume 40 such that the output piston 45 is driven out with a resulting actuating path $s_{ab}$ of the hydraulic actuator 5.

The deflection of the piezo actuator 10 is again suddenly reduced (e.g., depicted as steep negative gradient hA of the curve C1 in FIG. 2 (a)). As a result, the non-return valve 30 coupling the drive volume 25 to the output volume 40 closes, and the non-return valve 60 coupling the drive volume 25 to the prestressing volume 70 closes. Negative pressure is created by the reduced hydraulic oil in the drive volume 25, and as a result, the non-return valve 50 coupling the drive volume 25 to the reservoir 55 opens and the missing hydraulic oil flows from the reservoir 55 into the drive volume 25.

If, in the first operating mode of this cycle (e.g., rapid deflection and resetting of the piezo actuator 10) is repeated, the output piston 45 is continuously deflected. If a counterforce acts on the output piston 45, the pressure in the output volume 40 increases with this counterforce and the hydraulic cross section of the output cylinder 35. Because the threshold in the pressure-limiting valve 80 is very low because of the missing pressure in the prestressing volume 25, hydraulic oil already flows back from the output volume 40 into the reservoir 55 via the pressure-limiting valve 80 when there is a low counterforce on the output piston 45.

In a second operating mode, the hydraulic actuator 5 is operated with a high system stiffness and actuated at an actuating rate v1 (e.g., different from zero).

The piezo actuator 10 is actuated as graphically shown by curve C2 in FIG. 2. In (b), the piezo actuator 10 is quickly deflected (e.g., the actuating path $s_{an}$ rises with another steep gradient hS over time t).

The pressure in the drive volume 25 increases and the non-return valve 30 coupling the drive volume 25 to the output volume 40 opens, and the non-return valve 60 coupling the drive volume 25 to the prestressing volume 70 opens. Because the hydraulic oil flows away into the output volume 40, the pressure in the drive volume 25 falls as in the first operating mode described above.

In contrast to the first operating mode, deflection of the piezo actuator 10 is kept constant for a specific time (e.g., portion p of the curve C2 in FIG. 2 (b)). Because the non-return valve 30 coupling the drive volume 25 to the output volume 40 has a defined opening pressure, the non-return valve closes when the pressure difference between the drive volume 25 and the output volume 40 is smaller than the opening pressure of the non-return valve 30. Because the piezo actuator 10 is deflected, the remaining pressure is applied to the non-return valve 60 coupling the drive volume 25 to the prestressing volume. Because the non-return valve 60 coupling the drive volume 25 to the prestressing volume 70 is not prestressed, hydraulic oil may flow via the non-return valve 60 and the throttle 65 arranged downstream of the non-return valve 60 until the pressure difference between the prestressing volume 70 and the drive volume 25 is greater. Although a small portion of hydraulic oil again flows back into the reservoir 55 via the throttle 85 coupling the prestressing volume 70 to the reservoir 55, the pressure in the prestressing volume 70 increases. As a result, the opening threshold in the pressure-limiting valve 80 is increased.

After a specific time, the piezo actuator 10 is suddenly reset to original actuating path $s_{an}$ of the actuator (e.g., the steep negative gradient hA of curve C2 in FIG. 2 (b)). As a result, hydraulic oil is sucked from the reservoir 55 into the drive volume 25, as in the first operating mode described above. If the throttle 85 coupling the prestressing volume 60 to the reservoir 55 were not installed, hydraulic oil would be sucked out of the reservoir 55 and out of the prestressing volume 70.

The described cycle (e.g., deflection and resetting of the piezo actuator 10) is repeated. If a counterforce acts on the output piston 45, the pressure in the output volume 40 increases again. However, the threshold in the pressure-limiting valve 80 is greater than in the above-described first operating mode because of the increased pressure, and as a result, a higher force may build up on the drive piston 15 and the flow of hydraulic oil out of the output volume 40 is reduced. The system stiffness of the hydraulic actuator 5 is increased in this way. The level of this stiffness is set by the drive profile of the piezo actuator 10.

In a third operating mode, the hydraulic actuator 5 is operated with a high system stiffness and is not actuated (e.g., actuated at an actuating rate of v0=0).

The piezo actuator 10 is actuated as graphically shown by the curve C3 according to FIG. 2. In (c), because of slow deflection (e.g., comparatively shallow gradient nS) of the piezo actuator 10, the pressure in the drive volume 25 scarcely increases. As a result, only the non-return valve 60 coupling the drive volume 25 to the prestressing volume 70 opens, but the non-return valve 30 coupling the drive volume 25 to the output volume remains closed. As a result, no hydraulic oil is pumped into the output volume 40. Hydraulic oil is pumped only into the prestressing volume 70, resulting in the threshold of the pressure-limiting valve 80 and the system stiffness of the hydraulic actuator 5 increasing without the output piston 45 deflecting.

After a specific time, the piezo actuator 10 is suddenly reset to original actuating path $s_{an}$ of the actuator (e.g., the steep negative gradient hA of the curve C3 in FIG. 2 (c)).

Further exemplary embodiments not specifically illustrated and corresponding to the exemplary embodiment illustrated in FIGS. 1 and 2, an electrodynamic or an electromagnetic actuator is provided instead of a piezo actuator 10.

In further exemplary embodiments not specifically illustrated, the drive, output, and/or prestressing cylinders provided may be hydraulic cylinders in the form of folding bellows without pistons guided therein, instead of hydraulic cylinders with pistons guided therein.

The elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding or following claim, whether independent or dependent. Such new combinations are to be understood as forming a part of the present specification.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The invention claimed is:

1. A hydraulic actuator comprising:
a hydraulic drive cylinder with a drive piston provided therein;
a hydraulic output cylinder hydraulically coupled to the hydraulic drive cylinder; and
a pressure-limiting valve configured to limit a hydraulic pressure on the hydraulic output cylinder depending on an action time of a force on the hydraulic drive cylinder, the drive piston, or the hydraulic drive cylinder and the drive piston,
wherein the hydraulic drive cylinder is hydraulically coupled, by a non-return valve and a first throttle, to a prestressing volume located in a prestressing hydraulic cylinder via a prestressing piston, and
wherein the prestressing hydraulic cylinder or the prestressing piston actuates the pressure-limiting valve.

2. The hydraulic actuator of claim 1, wherein the prestressing volume is hydraulically connected to a reservoir via a second throttle.

3. The hydraulic actuator of claim 1, wherein the pressure-limiting valve is configured to limit pressure in relation to a reservoir or for releasing pressure into the reservoir.

4. The hydraulic actuator of claim 1, wherein an output piston is guided in the hydraulic output cylinder.

5. The hydraulic actuator of claim 1, wherein the hydraulic drive cylinder is coupled to the hydraulic output cylinder via a prestressed non-return valve.

6. The hydraulic actuator of claim 1, further comprising:
a drive actuator coupled in terms of movement to the hydraulic drive cylinder or to the drive piston.

7. The hydraulic actuator of claim 6, wherein the drive actuator comprises a piezo actuator, an electrodynamic actuator, or an electromagnetic actuator.

8. A method for operating a hydraulic actuator, the hydraulic actuator comprising a hydraulic drive cylinder with a drive piston, a drive actuator coupled in terms of movement to the hydraulic drive cylinder or the drive piston, and a pressure-limiting valve, wherein the hydraulic drive cylinder is hydraulically coupled, by a non-return valve and a first throttle, to a prestressing volume located in a prestressing hydraulic cylinder via a prestressing piston, the method comprising:
limiting, by the pressure-limiting valve of the hydraulic actuator, a hydraulic pressure on the hydraulic output cylinder depending on an action time of a force on the hydraulic drive cylinder, the drive piston, or the hydraulic drive cylinder and the drive piston;
actuating the pressure-limiting valve by the prestressing hydraulic cylinder or the prestressing piston; and
deflecting the drive actuator, the deflection having a deflection period at a deflection frequency for a duration of an operating or non-operating phase of the hydraulic actuator,
wherein the deflection period defines a movement stiffness of the hydraulic actuator, and the deflection frequency defines a resulting deflection rate of the hydraulic actuator.

9. The method of claim 8, wherein the drive actuator is electrically controllable.

10. The method of claim 9, wherein the drive actuator comprises a piezo actuator, an electrodynamic actuator, or an electromagnetic actuator.

11. The method of claim 8, wherein the drive actuator is coupled in terms of movement to a hydraulic actuator of the drive piston.

* * * * *